(12) United States Patent
Armour

(10) Patent No.: US 7,871,060 B2
(45) Date of Patent: Jan. 18, 2011

(54) SOLENOID ACTUATOR AND METHOD FOR MAKING AND USING SAME

(75) Inventor: John Armour, Park Ridge, IL (US)

(73) Assignee: Armour Magnetic Components, Inc., Chicago, IL (US)

( * ) Notice: Subject to any disclaimer, the term of this patent is extended or adjusted under 35 U.S.C. 154(b) by 831 days.

(21) Appl. No.: 11/520,173

(22) Filed: Sep. 13, 2006

(65) Prior Publication Data

US 2007/0062591 A1 Mar. 22, 2007

Related U.S. Application Data

(60) Provisional application No. 60/716,608, filed on Sep. 13, 2005.

(51) Int. Cl.
*H01F 3/00* (2006.01)
*F16K 31/02* (2006.01)

(52) U.S. Cl. .................. 251/129.15; 335/255; 335/262; 335/278; 335/279

(58) Field of Classification Search .................... 251/129.01–129.22; 335/255, 261–262, 278–279
See application file for complete search history.

(56) References Cited

U.S. PATENT DOCUMENTS 3,462,116 A * 8/1969 Wright, Jr. ............. 251/129.21

| | | | |
|---|---|---|---|
| 4,679,017 A | 7/1987 | Mishler et al. | |
| 5,523,684 A | 6/1996 | Zimmermann | |
| 2001/0033214 A1 | 10/2001 | Bircan | |

OTHER PUBLICATIONS

PCT Search Report Dated Feb. 5, 2007.

* cited by examiner

*Primary Examiner*—Ramon M Barrera
(74) *Attorney, Agent, or Firm*—Barnes & Thornburg LLP

(57) ABSTRACT

A solenoid actuator includes a generally cylindrical armature captured to a generally annular coil tube by means of interference geometry. A major portion of the coil tube has a first inside diameter and a second portion of the coil tube has a second, smaller inside diameter. A first portion of the armature has an outside diameter corresponding to the inside diameter of the first portion of the coil tube, and a second portion of the armature has an outside diameter corresponding to the inside diameter of the second portion of the coil tube. The armature is inserted within the coil tube such that the second portion of the armature is free to slide through the second end of the coil tube. A coil tube end closure, for example, a plug, is joined to the first portion of the coil tube. An O-ring provides a seal between the end closure and the tube. A wound electromagnetic coil surrounds the coil tube and can be selectively energized to displace the armature.

33 Claims, 3 Drawing Sheets

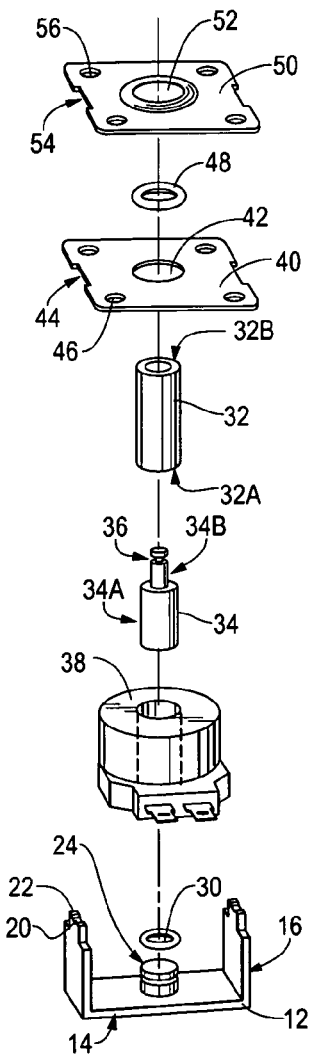
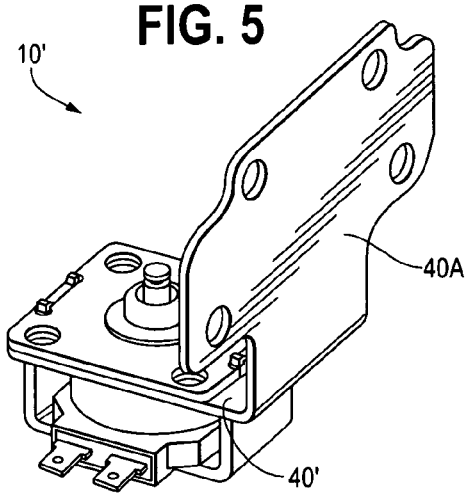
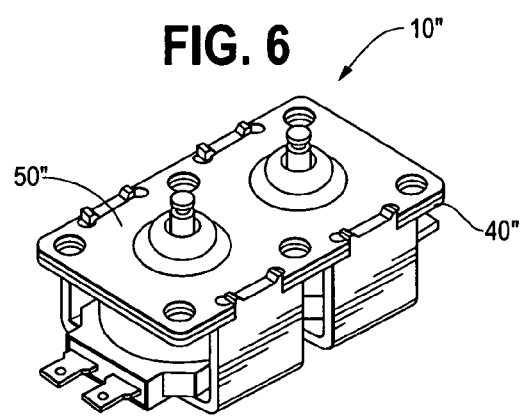
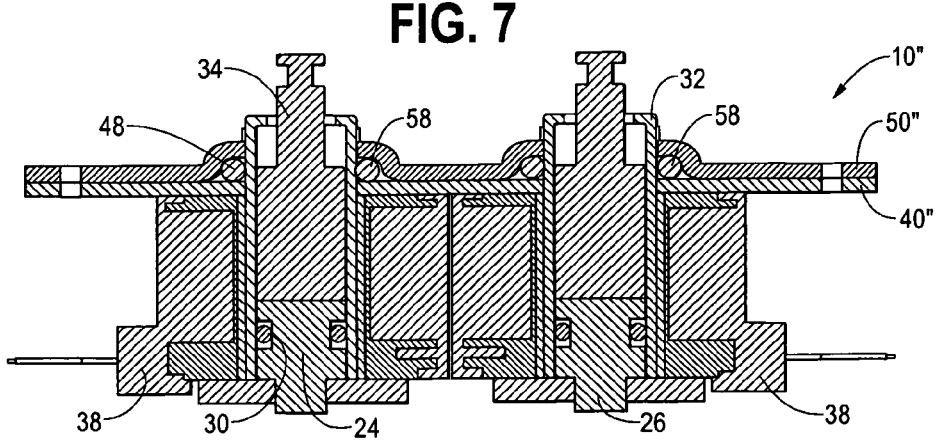

US 7,871,060 B2

SOLENOID ACTUATOR AND METHOD FOR MAKING AND USING SAME

CROSS REFERENCE TO RELATED APPLICATIONS

The present application claims priority to, and incorporates by reference the disclosure of, U.S. Provisional Patent Application No. 60/716,608, which was filed on Sep. 13, 2005.

BACKGROUND OF THE INVENTION

1. The Technical Field

The present invention is directed generally to solenoid actuators and more particularly to a novel solenoid actuator having a captive armature that is especially well-suited for use as a valve actuator in liquid and gas systems.

2. The Related Art

A conventional solenoid actuator typically includes a ferrous plug attached to one end of a non-ferrous coil tube by conventional means, for example, welding, gluing, roll-forming, or crimping. Depending on the attachment method used, an O-ring may be provided to form a seal between the plug and coil tube. The other end of the coil tube is assembled to a valve body mounting plate in a manner that effects a seal between the coil tube and mounting plate. The free end of the coil tube is inserted into the inside diameter of a wound electromagnetic coil. A frame is installed to this assembly, typically by means of screws or other fasteners securing the frame to the valve body mounting plate, to secure the coil to the mounting plate. The frame typically includes a hole having an inside diameter slightly larger than the outside diameter of the coil tube through which the end of the coil tube extends.

An armature is inserted into the open end of the coil tube. Typically, a return spring is provided to bias the armature away from the plug at the opposite end of the coil tube. A valve poppet is mounted near the free end of the armature. A spring retainer and/or flat washer may be installed between the spring and valve poppet. The entire assembly then is mounted to a valve body, typically using threaded fasteners.

This conventional design has many shortcomings. First, the armature is free to fall out of the coil except when the actuator is assembled to the valve body. Nothing prevents the armature from falling out of the coil tube while assembling the actuator to the valve body or when removing the actuator from the valve body for maintenance, for example, replacement of the valve poppet. This makes it impractical to use automated assembly equipment for assembling the actuator to the valve body. Second, the mechanical joint and/or seal between the plug and coil tube can become compromised as a result of the armature hammering against the plug as the actuator is cycled during normal use. Third, the use of threaded fasteners to secure the frame to the valve body mounting plate adds expense and complexity to the assembly process. Fourth, such fasteners can back out during operation as a result of vibration, resulting in failure of the actuator and loss of valve function.

Another, less common, known technology uses a coil tube having a plug attached at one end, as described above, and a flange at the other end. The coil tube is inserted into a gasket, a frame, and a wound coil. This assembly is then mated to a valve body such that the gasket forms a seal between the coil tube flange and frame. Another gasket may be provided to form a seal between the foregoing assembly and the valve body. This technology suffers from all of the shortcomings described above and the additional shortcoming of a coil tube that is not secured by the frame and, therefore, must be retained by some external means until the actuator is assembled to the valve body.

SUMMARY OF THE INVENTION

The present invention overcomes the shortcomings of the prior art by providing a solenoid actuator having a captive armature. In preferred embodiments, the present invention uses fewer parts than the conventional actuator described above and is easier and less costly to assemble.

BRIEF DESCRIPTION OF THE DRAWINGS

FIG. 4 is an exploded perspective view of a solenoid actuator according to the present invention;

FIG. 5 is a perspective view of a solenoid actuator with integral mounting bracket according to the present invention;

FIG. 6 is a perspective view of a dual solenoid actuator according to the present invention;

FIG. 7 is a cross-sectional side elevation view of a dual solenoid actuator according to the present invention;

DETAILED DESCRIPTION OF THE ILLUSTRATED EMBODIMENTS

Figure 1:
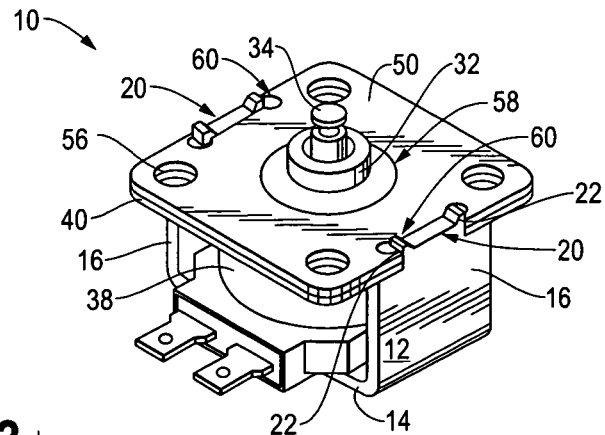
FIG. 1 is a perspective view of a solenoid actuator according to the present invention.
Figure 2:
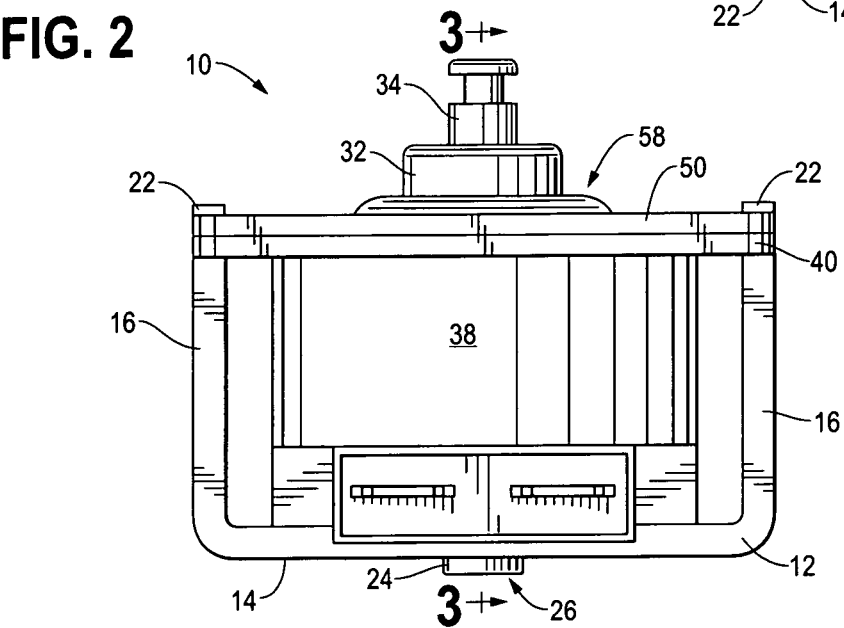
FIG. 2 is an end elevation view of a solenoid actuator according to the present invention.
Figure 3:
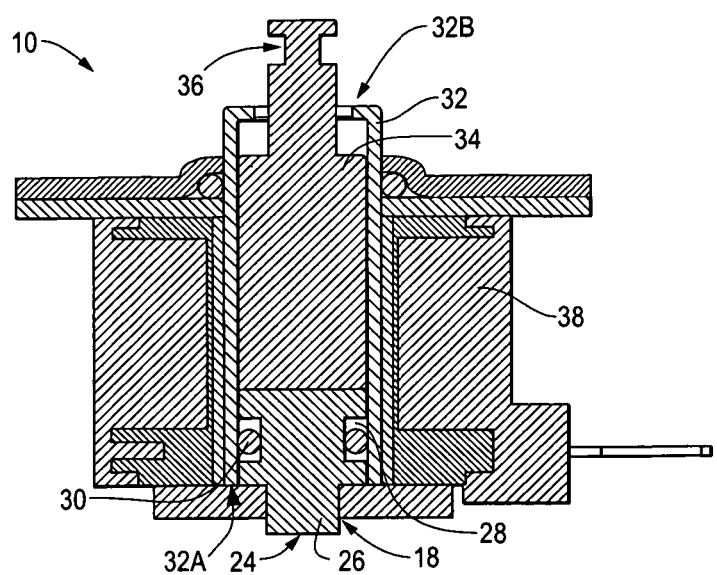
FIG. 3 is a cross-sectional side elevation view of a solenoid actuator according to the present invention taken through line 3-3 of FIG. 2.
Figure 8:
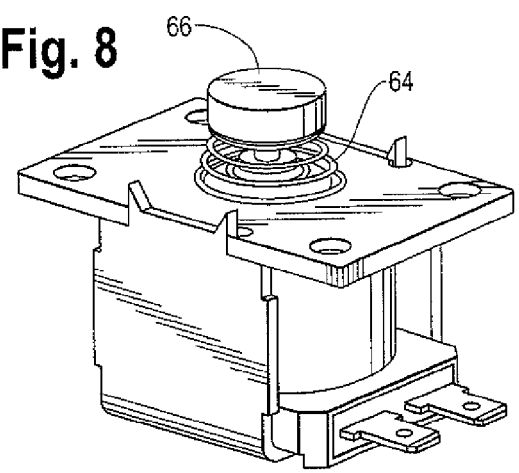
FIG. 8 is a perspective view of a solenoid actuator with valve poppet and return spring according to the present invention.

FIGS. 1-4 illustrate a solenoid actuator 10 according to a preferred embodiment of the present invention. Solenoid actuator 10 includes a frame 12 having a base 14 and two sides 16, each of which is generally perpendicular to base 14. Base 14 preferably includes a locating aperture 18 for receiving nipple 26 of plug 24, as will be discussed further below. In embodiments wherein plug 24 does not include nipple 26, aperture 18 could be omitted from frame 12. A tab 20 preferably projects from an upper edge of each of sides 16 and one or more stakes 22 preferably project from each of tabs 20 for use in securing together the components comprising solenoid actuator 10, as will be discussed further below. Frame 12 can be made of any suitable ferrous or ferromagnetic material, as would be known to one skilled in the art. In a preferred embodiment, frame 12 is a C1010 steel stamping.

Plug 24 is a generally cylindrical structure attached to base 14 of frame 12. Preferably, plug 24 includes nipple 26 extending axially from one end. Nipple 26 is sized to mate with locating aperture 18 in frame 12. Nipple 24 would be omitted in embodiments wherein frame 12 does not include aperture 18. Preferably, plug 24 also includes a housing, for example, circumferential groove 28, for receiving a portion of a seal member, for example, an inner circumferential portion of plug O-ring 30. Plug 24 is made of a suitable ferrous or ferromagnetic material, for example, 12L14 steel, as would be known to one skilled in the art.

Coil tube 32 is a generally annular structure having a substantially uniform outside diameter and first and second ends 32A and 32B, respectively. The portion of coil tube 32 extending from first end 32A to a point toward second end 32B has a first inside diameter generally corresponding to the diameter of plug 24 such that coil tube 32 can be engaged with plug 24 by sliding first end 32A of coil tube 32 over the free end of plug 24 and plug o-ring 30 and, preferably, against the adjacent surface of base 14 of frame 12. Plug 24, coil tube 32 and plug o-ring 30 interact to effect secure engagement of coil tube 32 to plug 24 and a gas- and/or liquid-tight seal therebetween. The portion of coil tube 32 near second end 32B has a second inside diameter which is smaller than the first inside diameter of coil tube 32 such that coil tube 32 can capture armature 34, as discussed further below. Coil tube 32 is made of a suitable non-ferrous material, for example, type 304 stainless steel or half-hard brass, as would be known to one skilled in the art.

Armature 34 is a generally cylindrical structure with a first portion 34A having a first diameter and a second portion 34B having a second diameter. The diameter of first portion 34A of armature 34 generally corresponds to the inside diameter of coil tube 32, such that armature 34 can slide freely within coil tube 32. The diameter of second portion 34B of armature 34 is smaller than the diameter of first portion 34A and generally corresponds to the second inside diameter of coil tube 32 such that second portion 34B of armature 34 can slide freely through the aperture defined by second end 32B of coil tube 32. Because the diameter of first portion 34A of armature 34 is greater than the inside diameter of second end 32B of coil tube 32 (i.e., the second inside diameter of coil tube 32), armature 34 of assembled solenoid actuator 10 is captive within coil tube 32. Second portion 34B of armature 34 can include a circumferential groove 36 for receiving a valve poppet (not shown) as would be understood by one skilled in the art. Second portion 34B of armature 34 also can include a second circumferential groove (not shown) between first portion 32A and circumferential groove 36 for receiving a spring-retaining element, for example, a c-clip (not shown), as would be understood by one skilled in the art, and as discussed further below.

Wound coil 38 can be a conventional electromagnetic coil having an inside diameter that generally corresponds to the outside diameter of coil tube 32 so that wound coil 38 can be installed over coil tube 32. Wound coil 38 can be encapsulated or unencapsulated.

Figure 9:
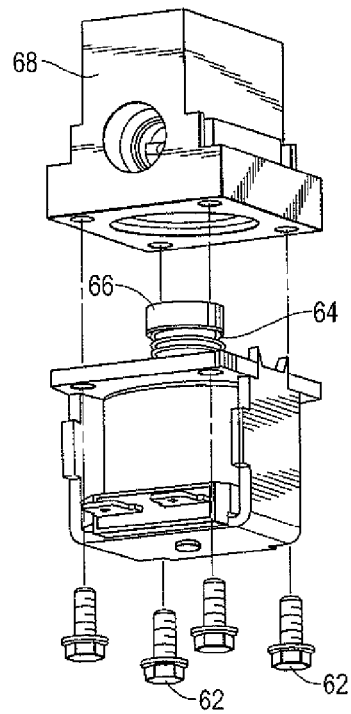
FIG. 9 is a perspective view of a solenoid actuator in combination with a valve body according to the present invention.

Top plate 40 is shown as generally rectangular but can have other shapes as well, as would be recognized by one skilled in the art. Top plate 40 includes an aperture 42 near its center for receiving the outside diameter of coil tube 32. Top plate 40 preferably includes insets 44 in the edge portions of opposing sides for receiving tabs 20 of frame 12. Top plate 40 also includes apertures 46 that receive screws 62 or other fasteners to secure actuator 10 to a valve body, as discussed further below. See FIG. 9. Top plate 40 may, but need not, include relief geometry (not shown) for receiving a seal or portion thereof, for example, relief geometry similar to circumferential relief portion 58 for receiving a portion of coil tube O-ring 48 as discussed below in connection with top compression plate 50.

Coil tube O-ring 48 preferably has an inner diameter slightly smaller than the outside diameter of coil tube 32 so that coil tube O-ring 48 can slide over the outside diameter of coil tube 32 in tight engagement.

Top compression plate 50 is similar to top plate 40 and includes a center aperture 52 for receiving outside diameter of coil tube 32, insets 54 in the edge portions of opposing sides for receiving tabs 20 of frame 12, and apertures 56 that receive screws 62 or other fasteners to secure actuator 10 to a valve body, as discussed further below. Dimples 60 preferably are provided adjacent the corner of insets 54 for receiving portions of stakes 22 when stakes 22 are deformed to secure the components comprising actuator 10, as discussed further below. Top compression plate 50 further includes a circumferential relief portion 58 about the perimeter of center aperture 52. The outer diameter of circumferential relief portion 58 corresponds generally to the outer diameter of coil tube O-ring 48, and circumferential relief portion 58 has a depth equal to about half the thickness of coil tube O-ring 48. Circumferential relief portion 58 provides a housing for at least a portion of coil tube O-ring 48. In embodiments where top plate 40 includes relief structure for receiving a seal member, for example, coil tube O-ring 48, circumferential relief portion 58 could be omitted from top compression plate 50.

A preferred method for assembling solenoid actuator 10 involves attaching plug 24 to frame 12 by any suitable means, as would be known to one skilled in the art. In embodiments wherein frame 12 includes locating aperture 18 and plug 24 includes nipple 26, nipple 26 is inserted into aperture 18 and secured to frame 12 by means of staking, interference fit, spin welding, bonding or other suitable technique, as would be known to one skilled in the art. In embodiments wherein plug 24 lacks nipple 26, plug 24 can be attached to frame 12 by welding, brazing, bonding, or other suitable technique, as would be known to one skilled in the art. In any event, techniques that eliminate or minimize air gaps between plug 24 and frame 12 are preferred because such air gaps adversely affect magnetic flux paths through frame 12 and plug 24, as would be understood by one skilled in the art.

Plug O-ring 30 is installed to groove 28 of plug 24 with or without the use of lubricants, as would be known to one skilled in the art.

Armature 34 is inserted into first end 32A of coil tube 32 so that second portion 34B of armature 34 can extend through the aperture defined by second end 32B of coil tube 32. The interference geometry described above prevents armature 34 from falling through second end 32B of coil tube 32. First end 32A of coil tube is then sleeved over plug 24 and plug O-ring 30, typically so that first end 32A of coil tube comes into contact with the corresponding surface of frame 12.

Top plate 40 is installed to the foregoing sub-assembly by ringing top plate center aperture 42 over coil tube 32 and engaging top plate insets 44 with tabs 20 of frame 12 so that top plate 40 is fully engaged with the upper edge portions of sides 16 of frame 12. Coil tube O-ring 48 is then installed to coil tube 24 and in engagement with top plate 40.

Top compression plate 50 is then installed by ringing top compression plate center aperture 52 over coil tube 32 and engaging top compression plate insets 54 with tabs 20 of frame 12 so that top compression plate 50 is engaged with top plate 40. Top compression plate 50 is pressed against frame 12, preferably compressing coil tube O-ring 48 such that it forms a seal between coil tube 32, top plate 40 and top compression plate 50. Stakes 22 are then deformed, preferably using a rotary staking/and or standard compression staking process, as would be known to one skilled in the art. Preferably, the deformed ends of stakes 22 are forced into dimples 60.

Solenoid actuator 10 can be used in a variety of applications. It is especially well-suited for use as a valve actuator in gas systems. In a preferred method of use, coil spring 64 is installed over armature 34 and retained by valve poppet 66 engaged with circumferential groove 36. Preferably, a flat washer (not shown) is installed over armature 34 between coil spring 64 and valve poppet 66 to provide a bearing surface for the end of the spring adjacent the valve poppet. The other end of the coil spring typically would bear against top compression plate 50. In other embodiments, particularly embodiments wherein armature 34 includes a second circumferential groove (not shown) as discussed above, coil spring 64 is installed over armature 34 and retained by a c-clip (not shown) engaged with such second circumferential groove. The foregoing assembly, including spring 64 and valve poppet 66, then is installed to valve body 68 having a seat (not shown) for receiving valve poppet 66, preferably using screws 62 or other threaded fasteners, as would be known to one skilled in the art. Typically, a gasket (not shown) would be installed between top compression plate 50 and valve body 68.

In use, spring 64 biases valve poppet 66 into the valve seat, stopping fluid flow through the valve. When wound coil 38 is energized, the resultant magnetic force draws armature 34 toward plug 24, thus withdrawing valve poppet 66 from the valve seat and allowing flow through the valve.

Solenoid actuator 10 can be modified in many ways without departing from the scope of the invention as defined by the claims below. Some such modifications are illustrated in FIGS. 5-7. Solenoid actuator 10' illustrated in FIG. 5 is identical to solenoid actuator 10 in all respects except that it includes a top plate 40' including mounting bracket portion 40A in lieu of the top plate 40 of actuator 10. Bracket portion 40A can be used to facilitate attachment of solenoid actuator 10' to other structure. FIGS. 6-7 illustrate a dual actuator embodiment 10" wherein two solenoid actuators share a common top plate and top compression plate. Other embodiments can include more than two actuators sharing a common top plate and top compression plate. In further multiple actuator embodiments, only one of the top plate and top compression plate need be common to more than one actuator.

Figure 10:
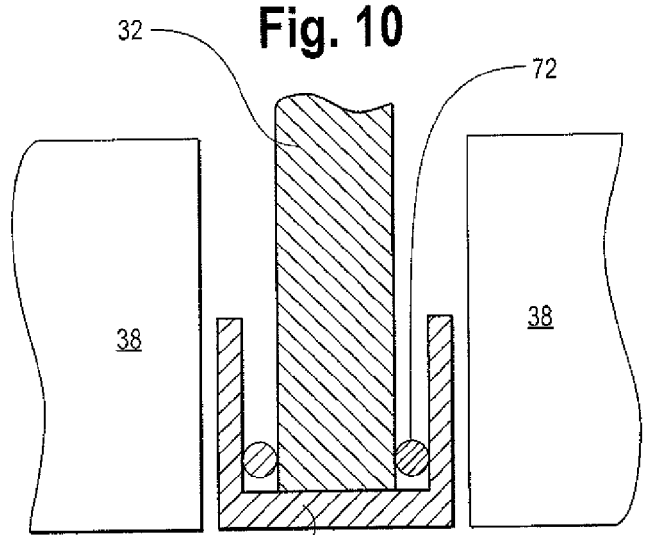
FIG. 10 is a cross-sectional side elevation view of a portion of a solenoid actuator according to the present invention.
Figure 11:
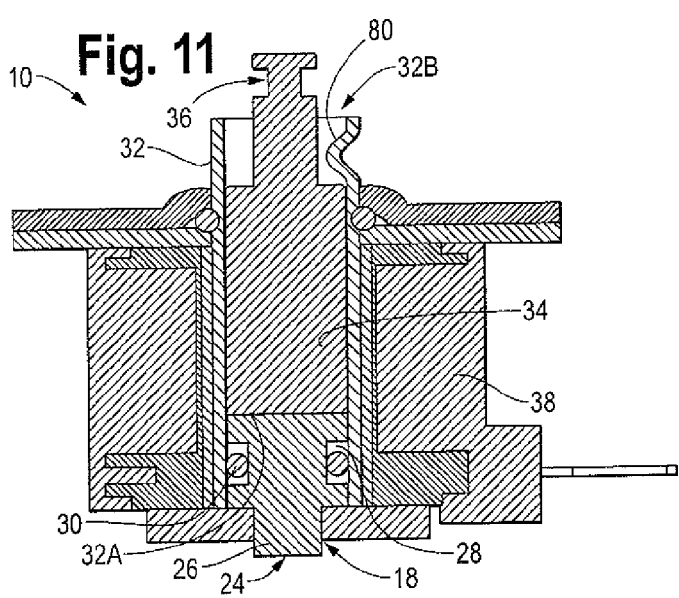
FIG. 11 is a cross-sectional side elevation view of an alternate embodiment of a solenoid actuator according to the present invention taken through line 3-3 of FIG. 2.

Many other modifications are possible, as well, as would be recognized by one skilled in the art. For example, whereas the specification discloses specific interference geometry for capturing armature 34 to coil tube 32, armature 34 could be captured to coil tube 32 in other ways, including a stop 80 incorporated into the inside diameter of coil tube 32, as shown in FIG. 11. This interference geometry could be stamped, crimped, roll-formed, cold-headed or otherwise incorporated into the coil tube. As another example, a ferromagnetic cap 70 sleeved over the outside of coil tube 32 with or without an intermediary O-ring 72 or other seal, as shown in FIG. 10, could take the place of plug 24 and plug O-ring 30. Cap 70 and/or coil tube 32 can include a housing (not shown) for receiving at least a portion of O-ring 72. As a further example, plug 24 could be integrated with and sealed to coil tube 32 by brazing, bonding, or other means, and plug O-ring 30 could be omitted. As such, this specification should not be construed as limiting the invention to any particular embodiment.

The invention claimed is:

1. A solenoid actuator, comprising:
    an electromagnetic coil defining an aperture therethrough;
    a non-ferromagnetic coil tube having a first end and a second end, at least a portion of said coil tube disposed within said aperture of said electromagnetic coil, said coil tube comprising a substantially annular tube having a first end, a second end, a first portion and a second portion, said first portion of said coil tube having a first inside diameter and said second portion of said coil tube having a second inside diameter smaller than said first inside diameter;
    a ferromagnetic coil tube end closure, said coil tube end closure substantially closing said first end of said coil tube;
    a top plate defining an aperture, at least a portion of said coil tube disposed within said aperture;
    a top compression plate defining an aperture, at least a portion of said coil tube disposed within said aperture;
    a top seal member engaged with said top plate, said top compression plate, and said coil tube; and
    a ferromagnetic armature comprising a generally cylindrical structure having a first end, a second end, a first portion having a diameter generally corresponding to said inside diameter of said first portion of said coil tube, and a second portion having a diameter generally corresponding to said inside diameter of said second portion of said coil tube;
    wherein said first portion of said armature is in sliding engagement with said first portion of said coil tube and said second portion of said armature is free to slide through said second portion of said coil tube;
    wherein said coil tube end closure prevents said armature from escaping from said coil tube through said first end of said coil tube; and
    wherein said second portion of said coil tube prevents said first portion of said armature from escaping from said coil tube through said second end of said coil tube.

2. The solenoid actuator of claim 1 further comprising a bottom seal member engaged with said coil tube end closure and said coil tube.

3. The solenoid actuator of claim 2 wherein said coil tube end closure comprises a housing receiving at least a portion of said bottom seal member.

4. The solenoid actuator of claim 1, said top compression plate further comprising a housing receiving at least a portion of said top seal member.

5. The solenoid actuator of claim 1, at least one of said top plate and said top compression plate further comprising a mounting bracket.

6. The solenoid actuator of claim 1 wherein said coil tube end closure comprises a plug.

7. The solenoid actuator of claim 6 further comprising a bottom seal member engaged between said plug and said coil tube.

8. The solenoid actuator of claim 1 wherein said coil tube end closure comprises a cap.

9. The solenoid actuator of claim 8 further comprising a bottom seal member engaged between said cap and said coil tube.

10. The solenoid actuator of claim 1, said top compression plate further comprising relief structure receiving at least a portion of said top seal member.

11. The solenoid actuator of claim 1, further comprising a frame, said frame comprising at least one deformable stake for securing said top compression plate to said frame.

12. The solenoid actuator of claim 1, further comprising:
    a valve poppet connected to said armature; and
    a spring engaged with said top compression plate and said valve poppet.

13. The solenoid actuator of claim 12 attached to a valve body.

14. A solenoid actuator assembly comprising:
    a plurality of sub-assemblies, each said sub-assembly comprising:

an electromagnetic coil defining an aperture therethrough;

a non-ferromagnetic coil tube having a first end and a second end, at least a portion of said coil tube disposed within said aperture of said electromagnetic coil, said coil tube comprising a substantially annular tube having a first end, a second end, an inside diameter and a stop extending inwardly from said inside diameter;

a ferromagnetic coil tube end closure, said coil tube end closure substantially closing said first end of said coil tube; and a ferromagnetic armature comprising a generally cylindrical structure having a first end, a second end, a first portion having a diameter generally corresponding to said inside diameter of said coil tube, and a second portion having a diameter smaller than said diameter of said first portion;

wherein said first portion of said armature is in sliding engagement with said inside diameter of said coil tube;

wherein said coil tube end closure prevents said armature from escaping from said coil tube through said first end of said coil tube;

wherein said stop prevents said first portion of said armature from escaping from said coil tube through said second end of said coil tube; and wherein said second portion of said armature is free to slide past stop;

receiving means for receiving the coil tube of each of said plurality of sub-assemblies; and a plurality of top seal members, each of said plurality of top seal members engaged with said receiving means and a corresponding one of said coil tubes so as to effect a seal between said receiving means and said corresponding one of said coil tubes.

15. The solenoid actuator assembly of claim 14 wherein said receiving means comprises:
a top plate having a plurality of coil-tube receiving apertures therein; and
a plurality of top compression plates, each of said top compression plates having at least one coil-tube receiving aperture therein.

16. The solenoid actuator assembly of claim 14 wherein said receiving means comprises:
a top compression plate having a plurality of coil-tube receiving apertures therein; and
a plurality of top plates, each of said top plates having at least one coil-tube receiving aperture therein.

17. The solenoid actuator assembly of claim 14 wherein said receiving means comprises:
a top compression plate having a plurality of coil-tube receiving apertures therein; and
a top plate having a plurality of coil-tube receiving apertures therein.

18. The solenoid actuator of claim 1 wherein said second inside diameter of said coil tube is smaller than said diameter of said first portion of said armature.

19. The solenoid actuator of claim 1 wherein said first portion of said armature is adjacent said first end of said armature.

20. A solenoid actuator, comprising:
an electromagnetic coil defining an aperture therethrough;
a non-ferromagnetic coil tube having a first end and a second end, at least a portion of said coil tube disposed within said aperture of said electromagnetic coil, said coil tube comprising a substantially annular tube having a first end, a second end, an inside diameter, and a stop extending inwardly from said inside diameter;

a ferromagnetic coil tube end closure, said coil tube end closure substantially closing said first end of said coil tube;

a top plate defining an aperture, at least a portion of said coil tube disposed within said aperture;

a top compression plate defining an aperture, at least a portion of said coil tube disposed within said aperture;

a top seal member engaged with said top plate, said top compression plate, and said coil tube; and a ferromagnetic armature comprising a generally cylindrical structure having a first end, a second end, a first portion having a diameter generally corresponding to said inside diameter of said coil tube, and a second portion having a diameter smaller than said diameter of said first portion;

wherein said first portion of said armature is in sliding engagement with said inside diameter of said coil tube;

wherein said coil tube end closure prevents said armature from escaping from said coil tube through said first end of said coil tube;

wherein said stop prevents said first portion of said armature from escaping from said coil tube through said second end of said coil tube; and wherein said second portion of said armature is free to slide past said stop.

21. The solenoid actuator of claim 20 further comprising a bottom seal member engaged with said coil tube end closure and said coil tube.

22. The solenoid actuator of claim 21 wherein said coil tube end closure comprises a housing receiving at least a portion of said bottom seal member.

23. The solenoid actuator of claim 20, said top compression plate further comprising a housing receiving at least a portion of said top seal member.

24. The solenoid actuator of claim 20, at least one of said top plate and said top compression plate further comprising a mounting bracket.

25. The solenoid actuator of claim 20 wherein said coil tube end closure comprises a plug.

26. The solenoid actuator of claim 20 wherein said coil tube end closure comprises a cap.

27. The solenoid actuator of claim 20, said top compression plate further comprising relief structure receiving at least a portion of said top seal member.

28. The solenoid actuator of claim 20, further comprising a frame, said frame comprising at least one deformable stake for securing said top compression plate to said frame.

29. The solenoid actuator of claim 20 further comprising:
a valve poppet connected to said armature; and
a spring engaged with said top compression plate and said valve poppet.

30. The solenoid actuator of claim 29 attached to a valve body.

31. The solenoid actuator of claim 20, wherein said first portion of said armature is adjacent said first end of said armature.

32. The solenoid actuator of claim 25 further comprising a bottom seal member engaged between said plug and said coil tube.

33. The solenoid actuator of claim 26 further comprising a bottom seal member engaged between said cap and said coil tube.

* * * * *